United States Patent

Gomez

[11] Patent Number: 5,600,219
[45] Date of Patent: Feb. 4, 1997

[54] SENSORLESS CLOSED-LOOP ACTUATOR UNLATCH

[75] Inventor: Kevin A. Gomez, Singapore, Singapore

[73] Assignee: Seagate Technology, Inc., Scotts Valley, Calif.

[21] Appl. No.: 256,172
[22] PCT Filed: Mar. 14, 1994
[86] PCT No.: PCT/US94/02745
§ 371 Date: Jun. 29, 1994
§ 102(e) Date: Jun. 29, 1994
[87] PCT Pub. No.: WO95/25327
PCT Pub. Date: Sep. 21, 1995
[51] Int. Cl.$^6$ ................................ G11B 21/02
[52] U.S. Cl. ................ 318/456; 318/459; 388/910; 388/928.1; 360/78.12; 360/105
[58] Field of Search ........................... 318/565, 567, 318/162, 456, 459, 461, 466, 470, 478, 479, 490; 388/909, 910, 928.1; 360/75, 78.06, 78.12, 105

[56] References Cited

U.S. PATENT DOCUMENTS

| | | | |
|---|---|---|---|
| 4,807,072 | 2/1989 | Ono et al. | 360/105 |
| 4,864,437 | 9/1989 | Couse et al. | 360/75 |
| 4,890,174 | 12/1989 | Chalmers et al. | 360/78.12 |
| 4,903,157 | 2/1990 | Malek | 360/105 |
| 5,043,834 | 8/1991 | Kubo et al. | 360/105 |
| 5,189,576 | 2/1993 | Morehouse et al. | 360/105 |
| 5,303,101 | 4/1994 | Hatch et al. | 360/105 |

FOREIGN PATENT DOCUMENTS

| | | |
|---|---|---|
| 0097208 | 1/1984 | European Pat. Off. . |
| WO8908916 | 9/1989 | WIPO . |
| WO8908313 | 9/1989 | WIPO . |
| WO9013113 | 11/1990 | WIPO . |

*Primary Examiner*—Bentsu Ro
*Attorney, Agent, or Firm*—Kinney & Lange, P.A.

[57] ABSTRACT

A first method for detecting movement of an actuator includes supplying a demand current to a voice coil motor of the actuator ($A_1$), sampling a voice coil motor voltage ($B_1$), performing a slope detection of a voice coil motor voltage function ($C_1$) and extrapolating the voice coil motor function ($D_1$) to identify a change in slope of the voice coil motor function.

A second method for detecting movement of an actuator includes supplying a continuously increasing current ramp to the voice coil motor of an actuator ($A_2$), measuring a back e.m.f. voltage of the voice coil motor ($B_2$), performing a change in slope detection of a back e.m.f. voltage function ($C_2$) and integrating the back e.m.f. voltage function ($D_2$) to determine movement of the actuator.

9 Claims, 5 Drawing Sheets

5,600,219

SENSORLESS CLOSED-LOOP ACTUATOR UNLATCH

BACKGROUND OF THE INVENTION

The present invention relates to controlling an actuator in a disc drive system. More particularly, the present invention relates to accurately determining the time of actuator unlatch in a disc drive.

In a disc drive system, it is sometimes desirable to restrain the actuator from movement. For example, transporting the disc drive or periods during which the disc drive is not in operation require that the actuator be restrained or "latched". An actuator has attached to its head-arm assembly, multiple magnetic read/write heads which are delicate instruments. Therefore, if the actuator is allowed to move when the drive sustains rough handling, such as during shipping, damage to the heads and/or the disc could occur.

The actuator may be restrained using a magnetic latch which holds the actuator in place over a specific area on the magnetic media disc. On zone bit recording drives, the initial demand current pulse which unlatches the actuator also accelerates the actuator. Immediately after unlatch, the actuator is moved to the outer zone of the disc to synchronize with the servo pattern of the disc. The initial acceleration demand current pulse is followed by an opposite deceleration pulse to slow the head to zero velocity to retrieve the servo pattern. Track seek operations begin after the servo pattern has been retrieved to move the actuator to specific disc locations.

To unlatch the actuator and accelerate it to a desired location on a magnetic media disc, a transconductance amplifier circuit converts input voltage, originating from the controlling code in the CPU, to demand current. The demand current is supplied to a voice coil motor (VCM) of the actuator. The initial demand current unlatches the actuator (in theory) and accelerates it to an outermost zone of the disc so that the servo pattern of the disc may be retrieved. After the actuator is unlatched and it begins to move, however, a "back" electromotive force (e.m.f.) voltage appears across the VCM. Thus, when the actuator is in motion, such as when it is enroute to the outermost zone of the disc, the transconductance amplifier circuit supplies voltage to the VCM to compensate for the back e.m.f. voltage.

The existing unlatch/track seek process is essentially an open loop procedure. As a result, there is no means for the controlling code to receive an indication that the actuator has actually been unlatched after the initial demand current pulse. If the first unlatch attempt fails, the entire process must be repeated with stronger and longer duration current pulses until the actuator is unlatched. Increasing the demand current, however, may cause the magnetic read/write head to catastrophically crash into the magnetic media disc. Damage to the magnetic head will occur if the latch is actually a weaker latch than anticipated and an excessive acceleration demand current has been applied.

Variations in manufacturing tolerances associated with the components of the latch (i.e., magnetic pole pieces, rubber housing etc.) have resulted in magnetic latches with poorly controlled latch forces. Present open-loop unlatch procedures often cannot unlatch strong latches on the first attempt. Poorly controlled latch forces have caused a significant problem with the conventional unlatch and acceleration process in that it is impossible to determine how much of the initial demand current was used to unlatch the actuator and how much resulted in acceleration. Thus, it is difficult to estimate the amount of deceleration current necessary to guarantee zero velocity at the end of acceleration.

SUMMARY OF THE INVENTION

The present invention uses the back e.m.f. voltage of the VCM to determine the time at which an actuator actually unlatches from the magnetic latch. More particularly, if the actuator is stationary (i.e. latched) there will be no back e.m.f. voltage. Once the actuator is unlatched and moves, however, a back e.m.f. voltage will be induced. By determining the point in time at which the back e.m.f. voltage appears (or changes), the time of actuator unlatch can be ascertained.

A first method employs an algorithm which detects the presence of a slope in a "VCM-HI" voltage function. By sampling the voltage at the VCM-HI node of the transconductance amplifier circuit, the back e.m.f. voltage can be indirectly obtained. More particularly, if the actuator is latched, the VCM-HI voltage will be a constant value (i.e. zero slope). Once unlatch occurs, however, the VCM-HI voltage will change to compensate for the change in back e.m.f. voltage. The voltage at the VCM-HI node is sampled to construct a VCM-HI voltage function. When a slope change is detected on the VCM-HI voltage function, actuator unlatch has occurred. Once unlatch is determined, the VCM-HI voltage function is extrapolated to determine actuator time of unlatch.

A second method directly measures the back e.m.f. voltage generated by the VCM. Using the second method, however, requires a supplemental circuit. The algorithm of the second method requires that a ramped demand current be supplied to the VCM. As the incrementing demand current is supplied to the VCM, the back e.m.f. voltage is measured using the supplemental circuit. A change in slope of the back e.m.f. voltage function indicates unlatch of the actuator. Once unlatch is determined, the back e.m.f. voltage function is integrated to determine the movement of the actuator.

In addition to providing confirmation of actuator unlatch, both methods provide actuator movement information which may be used to determine the required deceleration demand current needed to stop the actuator.

DETAILED DESCRIPTION OF THE PREFERRED EMBODIMENTS

Figure 1:
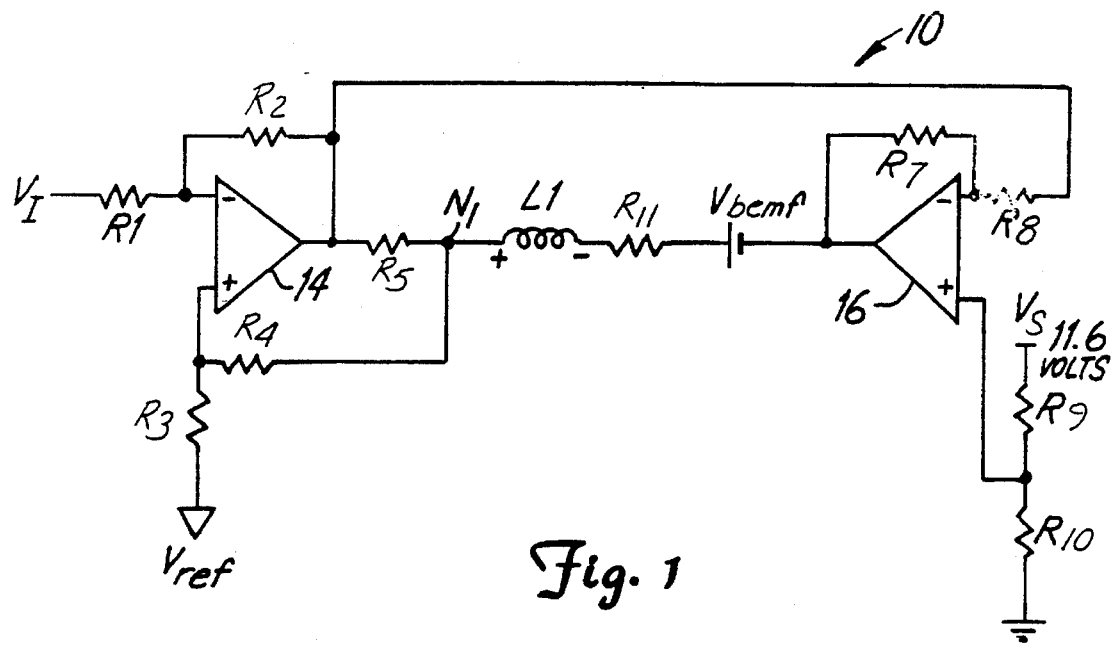
FIG. 1 shows a drive circuit which provides demand current to the VCM of the actuator.

FIG. 1 shows a typical bi-directional drive transconductance power amplifier circuit 10 used to drive a VCM. Circuit 10 includes power amplifiers 14 and 16 arranged in a push-pull configuration with current sense resistor $R_S$ and the VCM (represented by the series combination of inductor $L_1$ and resistor $R_{11}$). Also shown are resistors $R_1$, $R_2$, $R_3$, $R_4$, $R_7$, $R_8$, $R_9$ and $R_{10}$, input voltage $V_1$, reference voltage $V_{ref}$ and supply voltage $V_S$. The back e.m.f. voltage developed across the VCM is represented by voltage $V_{bemf}$. The connection from transconductance amplifier circuit 10 to the VCM is denoted as VCM-HI and VCM-LO at nodes $N_1$ and $N_2$, respectively.

In operation, current $I_O$, through the VCM and sense resistor $R_S$ is a linear function of input voltage $V_I$ represented by the expression:

$$\frac{-R_2(V_I - V_{ref})}{(R_1 - R_5)}$$

For a given input voltage $V_I$, transconductance amplifier circuit 10 will attempt to maintain the specified output current $I_O$. Accordingly, the output voltage across VCM-HI and VCM-LO will change to correct for back e.m.f. voltage or VCM resistance change due to temperature variance. Consequently, VCM-HI (and VCM-LO) will be a direct function of back e.m.f. voltage ($V_{bemf}$). The VCM-HI voltage value is represented by the equation:

$$VCM\text{-}HI = -V_I(K) + V_S/2 - V_{bemf}/2$$

where $K = R_2(R_S + R_{11})/(2R_1R_5)$. When a current is applied to the VCM, a voltage will appear on VCM-HI. The voltage at VCM-HI is due to the first two terms (i.e. $-V_I(K)$ and $V_S/2$) of the VCM-HI equation. If the actuator is stationary (i.e. latched) the VCM-HI voltage will remain constant. When the actuator moves, however, a back e.m.f. voltage ($V_{bemf}$) will appear as voltage source $V_{bemf}$ causing the VCM-HI voltage to decrease proportionately. The present invention uses the back e.m.f. voltage to detect movement of the actuator and hence, to determine the time of actuator unlatch.

Figure 2:
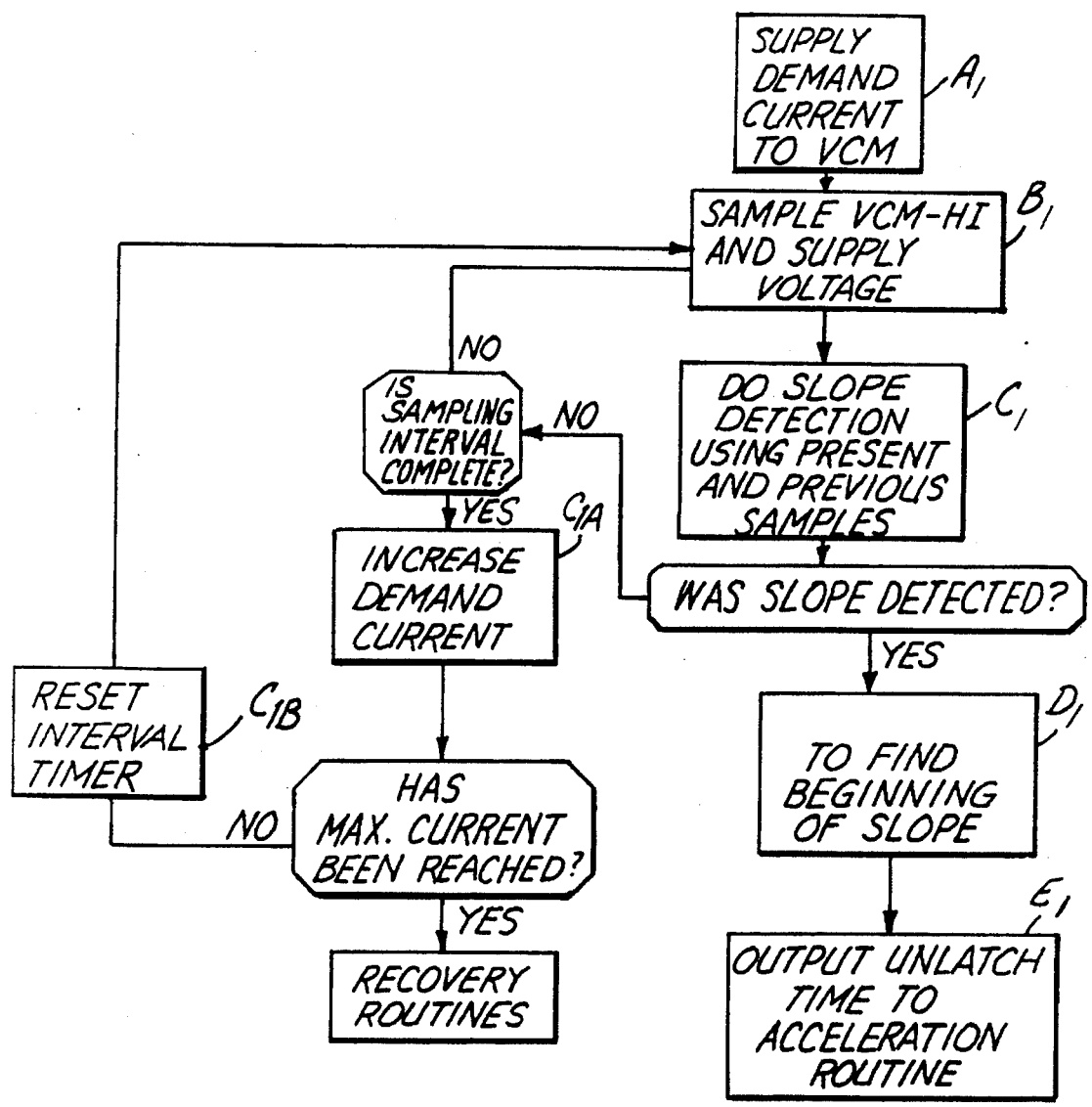
FIG. 2 is a flow diagram of the steps of a first method of the present invention.

FIG. 2 shows a flow diagram of the steps of the first method of the present invention.

Figure 3:
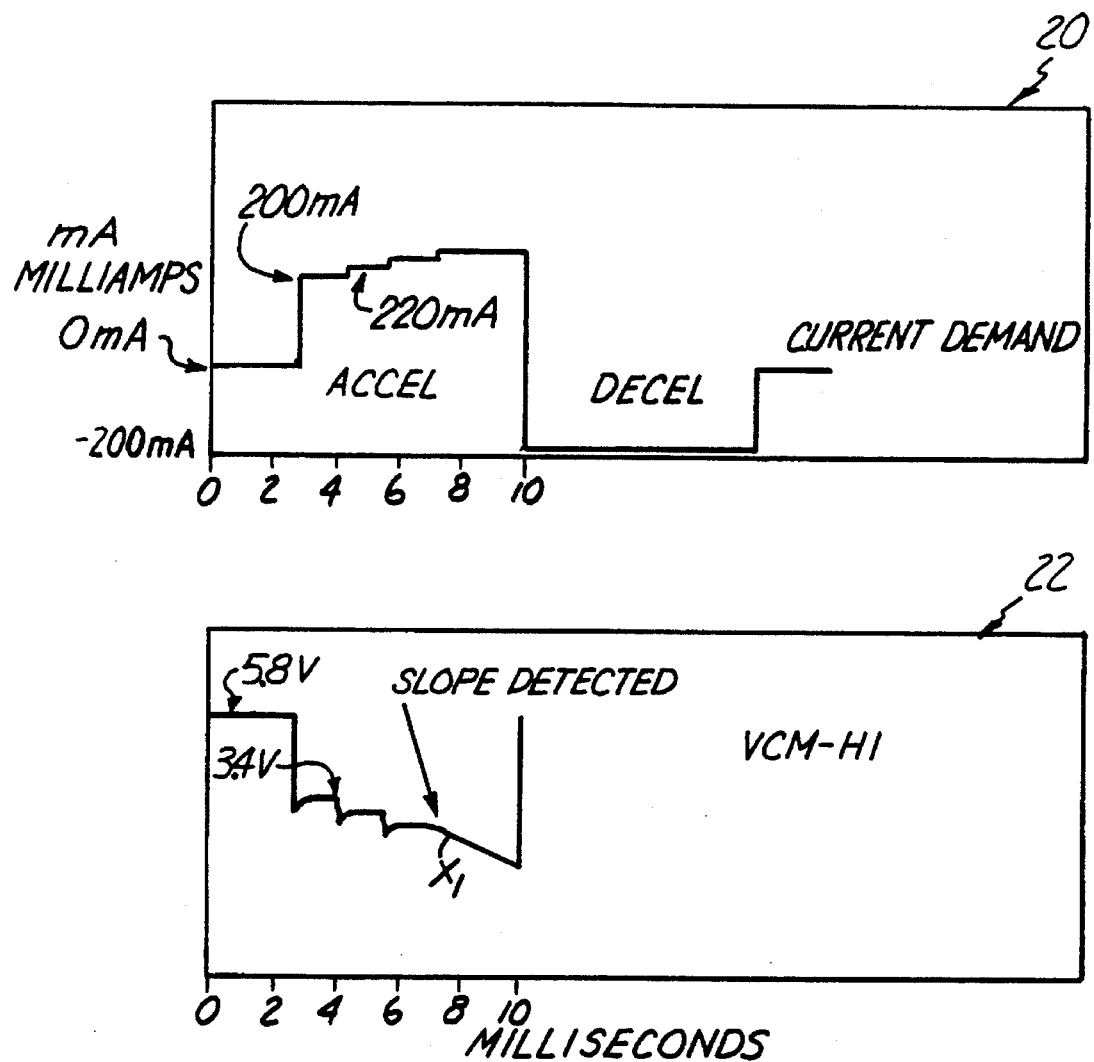
FIG. 3 shows plots of demand current and the VCM-HI voltage function for successful unlatch using the first method.

FIG. 3 shows plots of demand current and the VCM-HI voltage function for successful unlatch using the first method.

In process step $A_1$, a demand current is supplied to the VCM. Plot 20 of FIG. 3 shows the acceleration demand current function as it is supplied to the VCM in accordance with the step $A_1$. At step $B_1$, the VCM-HI voltage at node $N_1$ and supply voltage $V_S$ are sampled (see FIG. 1) using a voltage meter. Sampling continues until a slope change is detected. Sampling the supply voltage $V_S$ serves as a check to ensure that variations in VCM-HI voltage are not caused by variances in the supply voltage.

At step $C_1$, slope detection is performed using present and previous samples of the VCM-HI voltage. In other words, a VCM-HI voltage function is plotted using the voltage samples to determine a point on the VCM-HI voltage function where a slope change occurs.

If after step $C_1$, a slope change in the VCM-HI voltage function is not detected, one must determine if the sampling interval cycle has been completed. If the sampling cycle is incomplete, sampling must continue. If the cycle has been completed but no slope change was detected, the acceleration demand current is increased in step $C_{1A}$. If by increasing demand current, a maximum current is reached, other recovery routines (e.g. vibrating the actuator to induce unlatch) may be tried. If maximum current is not reached, the sampling interval timer is reset in step $C_{1B}$, and steps $B_1$–$C_1$ are repeated.

Plot 22 of FIG. 3 shows an example of a VCM-HI voltage function. At zero milliseconds, no current is supplied to the VCM. Accordingly, plot 22 shows at zero milliseconds, the VCM-HI voltage is 5.8 volts (i.e. at zero milliseconds VCM-HI is equal to VCM-LO which is half the supply voltage $V_S$). At two milliseconds, 200 milliamps of current are supplied to the VCM. At this point, VCM-HI voltage drops to 3.4 volts. In this case, the VCM-HI voltage is sampled for approximately six milliseconds before a slope change occurs at point $X_1$. Note that at approximately four, five and seven milliseconds, the acceleration demand current is increased in accordance with step $C_{1A}$. After slope detection, a deceleration current of –200 mA is applied.

In step $D_1$, the position of the actuator is extrapolated by noting the time of first slope detection. By determining the time of unlatch, the position of the actuator at that time can be determined. A corresponding deceleration current is then supplied (see plot 20).

At step $E_1$, actuator position information is output to a controller responsible for the actuator acceleration routine.

Figure 4:
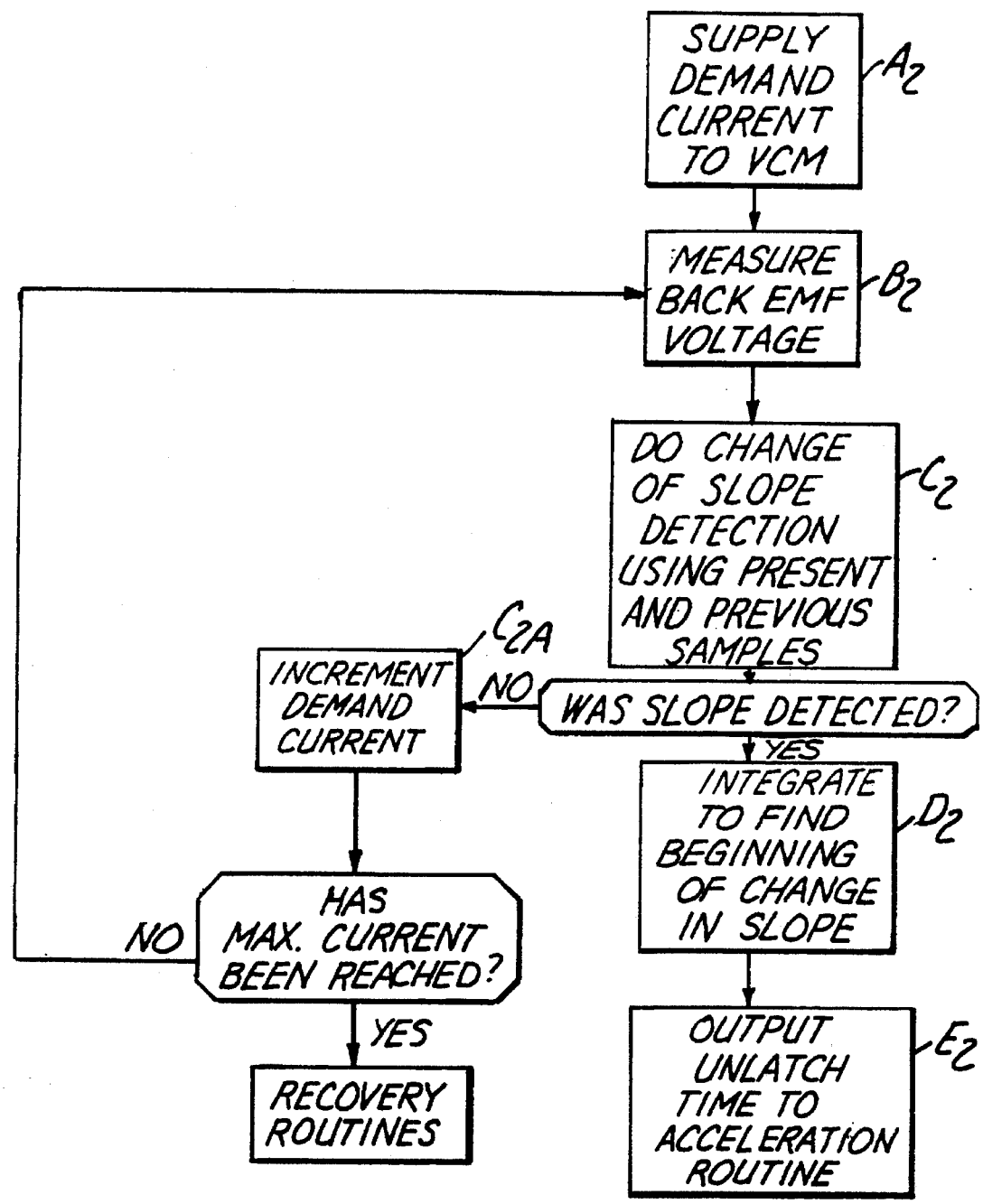
FIG. 4 is a flow diagram of the steps of a second method of the present invention.

FIG. 4 shows the flow diagram of the steps of a second method of the present invention.

Figure 5:
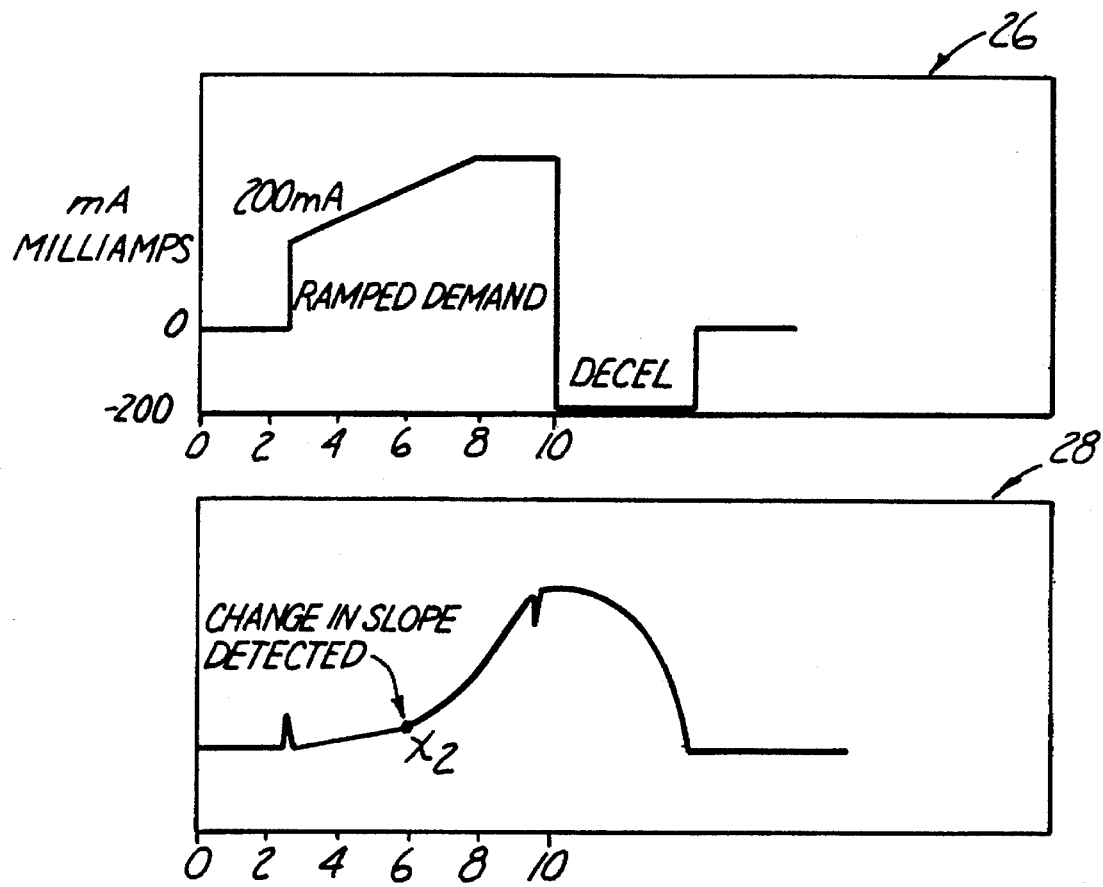
FIG. 5 shows plots of demand current and the back e.m.f. voltage function for successful unlatch using the second method.

FIG. 5 shows plots of the demand current and the back e.m.f. voltage function for successful unlatch of the actuator using the second method.

In process step $A_2$, a ramped demand current is supplied to the VCM. In step $B_2$, the back electromotive force voltage is measured using the circuitry disclosed in FIG. 6.

Figure 6:
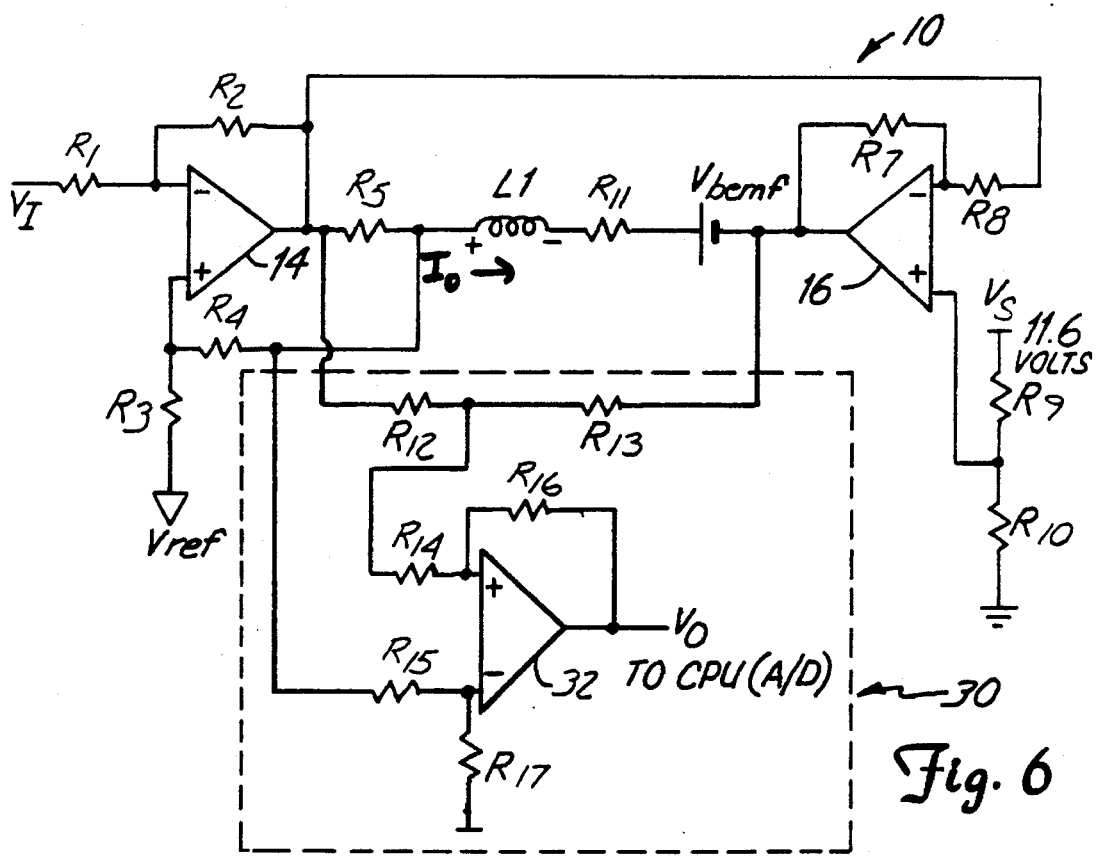
FIG. 6 shows the added circuitry used to measure back e.m.f. voltage in the second method.

In step $C_2$ a change in slope detection is performed using the back e.m.f. voltage as measured by the circuit shown in FIG. 6. A back e.m.f. voltage function is plotted to determine a point on the function where a change in slope occurs.

Plot 26 of FIG. 5 shows the initial ramped acceleration demand current provided to the VCM in step $A_2$. At zero milliseconds, no current flows to the VCM. At two milliseconds, the initial acceleration current is applied to the VCM. The initial current starts at 200 milliamps and increases incrementally until a change in slope of the back e.m.f. voltage function is detected. After a change in slope is detected, a controlled acceleration is followed by deceleration.

Plot 28 of FIG. 5 shows the resulting back e.m.f. voltage due to the acceleration demand current supplied to the VCM as shown in plot 26. In this case, the back e.m.f. voltage function increases in a constant fashion with current (as expected) for approximately 4 milliseconds. At about six milliseconds, however, there is a change in slope of the back e.m.f. voltage function. The change in slope occurs at point $X_2$.

The algorithm of the second method requires that the acceleration demand current be continuously increased until a change in slope is detected. While the current is supplied to the VCM, the back e.m.f. voltage is continuously measured.

If after step $C_2$, a change in slope is not detected, the initial demand current function is incremented by fixed intervals in step $C_{2A}$. If a maximum current value is attained in step $C_{2A}$, recovery routines are instigated. If a maximum current value has not been reached, steps $B_2$–$C_2$ are repeated.

In step $D_2$ the back e.m.f. voltage function is integrated to determine the first detection of the change in slope in order to estimate the position of the actuator at that time.

In step $E_2$, the position of the actuator at the time of unlatch is output to a controller which is responsible for the acceleration routine of the actuator.

Both first and second methods provide information as to when unlatch of the actuator occurs. The position of the actuator at the time of unlatch can be used to determine the amount of acceleration and/or deceleration current needed to achieve zero velocity of the actuator. By determining the actuator position, unnecessary excess current need not be applied which could accelerate the actuator at a rate of speed which may cause damage to the read/write heads and/or the magnetic disc.

FIG. 6 shows VCM back e.m.f. voltage measuring circuit 30 of the present invention. Circuit 30 is attached to transconductance amplifier circuit 10 (see FIG. 1) in order to directly measure back e.m.f. voltage when using the second method.

In a preferred embodiment of the present invention, circuit 30 is attached to circuit 10 at nodes $N_1$ and $N_2$. Circuit 30 includes differential amplifier 32 and resistors $R_{12}$, $R_{13}$, $R_{14}$, $R_{15}$, $R_{16}$ and $R_{17}$. The voltage across resistors $R_{12}$ and $R_{13}$ equals the VCM voltage and the back e.m.f. voltage of the VCM. The back e.m.f. voltage is represented as voltage $V_{bemf}$ in circuit 10. Amplifier 32 isolates the back e.m.f. voltage. Its amplified output, $V_O$, is supplied to a CPU analog-to-digital converter (not shown) so that it may be provided to the controller.

The invention provides a reliable method of determining when an actuator unlatch has occurred so that an accurate amount of deceleration current may be supplied to the VCM. The method is a cost effective way to save power and increase efficiency of the unlatch procedures.

Although the present invention has been described with reference to preferred embodiments, workers skilled in the art will recognize that changes may be made in form and detail without departing from the spirit and scope of the invention.

What is claimed is:

1. A method for detecting movement of an actuator comprises:

supplying current to a voice coil motor of the actuator;

sampling a voice coil motor voltage while supplying current to the voice coil motor;

performing a slope detection on a voice coil motor voltage function using the samples; and identifying a change in slope of the voice coil motor voltage function.

2. The method of claim 1 and further comprising extrapolating the voice coil motor voltage function to identify when the change in slope of the voice coil motor voltage function occurred and providing the change in function information to a controller.

3. The method of claim 1 wherein sampling the voice coil motor voltage comprises attaching a voltage meter to the voice coil motor.

4. The method of claim 1 wherein supplying current to the voice coil motor comprises incrementally increasing the current supplied until a change in the slope of the voice coil motor voltage function is detected.

5. The method of claim 1 wherein identifying a change in slope comprises plotting the voice coil motor voltage function and identifying a point where a non-zero slope occurs.

6. A method for detecting movement of an actuator comprises:

supplying a continuously increasing current to a voice coil motor of an actuator;

measuring a back e.m.f. voltage of the voice coil motor;

performing a change of slope detection of a back e.m.f. voltage function of voice coil motor; and integrating the back e.m.f. voltage function to determine movement of the actuator.

7. The method of claim 6 wherein measuring the back e.m.f. voltage comprises attaching a differential amplifier circuit to a transconductance amplifier circuit.

8. The method of claim 6 wherein performing a change in slope detection comprises plotting the measurements of the back e.m.f. voltage.

9. The method of claim 6 wherein supplying a continuously increasing current to the voice coil motor comprises supplying a ramped current to the voice coil motor until a maximum current is achieved.

* * * * *